United States Patent
Kim et al.

(10) Patent No.: US 9,100,969 B2
(45) Date of Patent: Aug. 4, 2015

(54) PHYSICAL LAYER FEEDBACK FOR IN-DEVICE COEXISTENCE INTERFERENCE MITIGATION

(75) Inventors: JoonBeom Kim, Carrollton, TX (US); Changhoi Koo, Plano, TX (US); Zhijun Cai, Euless, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 714 days.

(21) Appl. No.: 13/424,176

(22) Filed: Mar. 19, 2012

(65) Prior Publication Data
US 2013/0242860 A1    Sep. 19, 2013

(51) Int. Cl.
| | |
|---|---|
| *H04W 4/00* | (2009.01) |
| *H04W 72/08* | (2009.01) |
| *H04W 36/20* | (2009.01) |
| *H04W 72/12* | (2009.01) |
| *H04W 88/06* | (2009.01) |

(52) U.S. Cl.
CPC ............ *H04W 72/082* (2013.01); *H04W 36/20* (2013.01); *H04W 72/1215* (2013.01); *H04W 88/06* (2013.01)

(58) Field of Classification Search
CPC .......... H04W 72/082; H04W 72/1215; H04W 36/20
USPC ....................................................... 370/328
See application file for complete search history.

(56) References Cited

U.S. PATENT DOCUMENTS

| | | | |
|---|---|---|---|
| 2008/0260063 A1* | 10/2008 | Chen et al. .................... 375/267 |
| 2012/0020229 A1 | 1/2012 | Dayal et al. | |
| 2012/0069766 A1* | 3/2012 | Fu et al. ......................... 370/252 |
| 2012/0140716 A1* | 6/2012 | Baldemair et al. ............. 370/329 |
| 2012/0207040 A1* | 8/2012 | Comsa et al. .................. 370/252 |
| 2013/0203418 A1* | 8/2013 | Jang et al. ...................... 455/436 |
| 2013/0242830 A1* | 9/2013 | Lee et al. ....................... 370/311 |
| 2013/0294281 A1* | 11/2013 | Lee et al. ....................... 370/252 |
| 2014/0334330 A1* | 11/2014 | Baghel et al. .................. 370/252 |

OTHER PUBLICATIONS

CMCC, "New Study Item Proposal: Signalling and Procedure for In-Device Coexistence Interference Avoidance," 3GPP TSG RAN#48, RP-100671, Jun. 1-4, 2010, Soul, Korea, 5 pages.
CMCC; "Coexistence Studies Between LTE and WLAN," 3GPP TSG-RAN WG4 Meeting #54; R4-100706; Feb. 22-26, 2010; San Francisco, US; 7 pages.
CMCC; "Addition of LTE UE RF Requirements for Coexistence with WLAN," 3GPP TSG-RAN WG4 Meeting #54; R4-100707; Feb. 22-26, 2010; San Francisco, US; 6 pages.
3GPP; "LS on In-Device Coexistence Interference"; 3GPP TSG-RAN WG4 Meeting #55; R4-102268; May 10-14, 2010; Montreal, Canada; 1 page.
3GPP TS 36.211 V10.4.0 (2011-12); 3rd Generation Partnership Project; Technical Specification Group Radio Access Network; Evolved Universal Terrestrial Radio Access (E-UTRA); Physical Channels and Modulation (Release 10); 101 pages.

(Continued)

*Primary Examiner* — Sai-Ming Chan
(74) *Attorney, Agent, or Firm* — Fish & Richardson P.C.

(57) ABSTRACT

Systems, apparatuses, and methods for transmitting IDC information on a physical uplink channel are provided. A described technique includes identifying, at a user equipment (UE), in-device coexistence (IDC) interference, and transmitting, to a base station, an IDC indicator or selected IDC solution identifying the IDC interference on a physical layer uplink channel.

60 Claims, 8 Drawing Sheets

(56) References Cited

OTHER PUBLICATIONS

3GPP Ts 36.212 V10.4.0 (2011-12); 3rd Generation Partnership Project; Technical Specification Group Radio Access Network; Evolved Universal Terrestrial Radio Access (E-UTRA); Multiplexing and Channel Coding (Release 10); 79 pages.

3GPP TS 36.213 V10.4.0 (2011-12); 3rd Generation Partnership Project; Technical Specification Group Radio Access Network; Evolved Universal Terrestrial Radio Access (E-UTRA); Physical Layer Procedures (Release 10); 125 pages.

3GPP TR36.816 v11.2.0: (2011-12); 3rd Generation Partnership Project; Technical Specification Group Radio Access Network; Evolved Universal Terrestrial Radio Access (E-UTRA); Study on signalling and procedure for interference avoidance for in-device coexistence (Release 11), 44 pages.

International Report on Patentability under Chapter I issued in International Application No. PCT/US2013/029246 on Oct. 2, 2014; 11 pages.

International Search Report and Written Opinion of the International Searching Authority issued in International Application No. PCT/US2013/029246 on Apr. 22, 2013; 15 pages.

3GPP TS 36.213 V10.5.0; 3rd Generation Partnership Project; Technical Specification Group Radio Access Network; Evolved Universal Terrestrial Radio Access (E-UTRA); Physical Layer Procedures (Release 10); Mar. 7, 2012; 125 pages.

Research in Motion UK Limited: "Signaling Procedures for IDC Operation"; 3GPP TSG-RAN WG2 Meeting #77b; R2-121281; Jeju, Korea, Mar. 26-30, 2012.

Research in Motion UK Limited: "Buffer Status Reporting for TDM Solution"; 3GPP TSG-RAN WG2 Meeting #75; R2-113881; Athens, Greece, Aug. 22-26, 2011; 4 pages.

Extended Search Report issued in EP application No. 12185294.1 on Mar. 5, 2013; 12 pages.

* cited by examiner

PHYSICAL LAYER FEEDBACK FOR IN-DEVICE COEXISTENCE INTERFERENCE MITIGATION

FIELD

This disclosure relates to In-Device Coexistence (IDC) interference mitigation in wireless communication systems, and more particularly, to physical layer feedback for IDC interference mitigation.

BACKGROUND

In wireless radio access networks, User Equipment (UE) may support multiple radio technologies. For example, in an Evolved Universal Terrestrial Radio Access Network (E-UTRAN), a UE may support radio technologies such as Long Term Evolution (LTE), Industrial, Scientific and Medical (ISM, e.g., WiFi and Bluetooth), and Global Navigation Satellite System (GNSS). When multiple radio technologies operate on adjacent frequency bands or harmonic frequency bands simultaneously in a UE, the coexistence of the multiple radio technologies may cause In-Device Coexistence (IDC) interference in the UE. For example, when an LTE and ISM radio operate on adjacent frequency bands in the UE, such coexistence may cause interference to an LTE receiver.

BRIEF DESCRIPTION OF DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
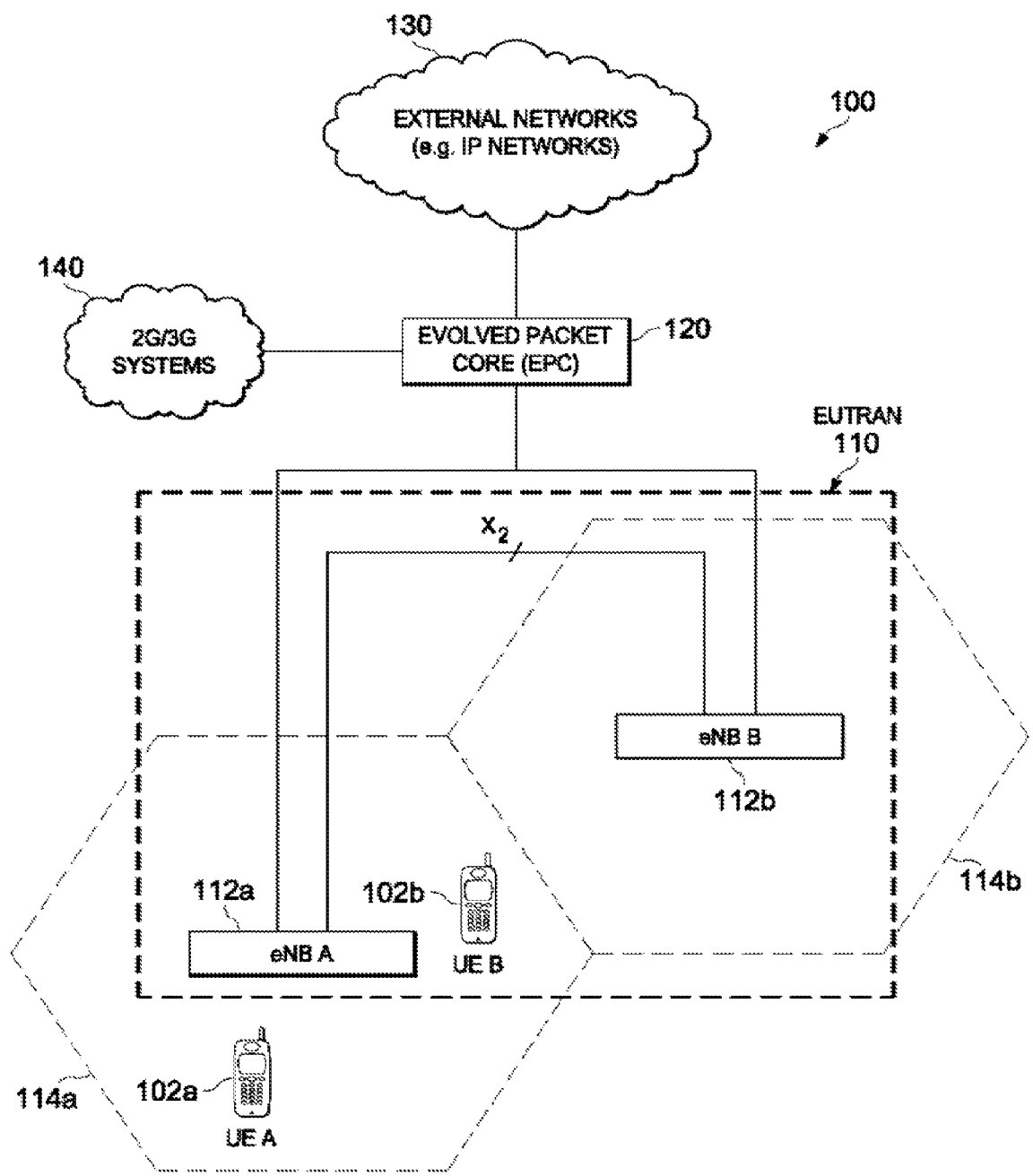
FIG. 1 is a schematic representation of an example wireless cellular communication system.

The present disclosure is directed to systems, methods, and apparatuses for managing IDC interference. In a general aspect, a UE may identify IDC interference and send a physical layer IDC indicator to a base station to report the IDC interference. The physical layer IDC indicator may be a one-bit information bit indicating whether the UE identifies IDC interference or not. After receiving the IDC indicator, the base station may execute a response signaling procedure and transmit a solution to the UE for IDC interference management. For example, when the IDC interference is caused by different radios operating on adjacent frequency bands or harmonic frequency bands on a UE, the base station may allocate a FDM or TDM solution to the UE in order to minimize, eliminate or otherwise reduce IDC interference. In some instances, a UE in an E-UTRAN network may support multiple radio technologies. Example radio technologies may include LTE, ISM (e.g., Bluetooth, Wireless Local Area Network (WLAN)), and Global Navigation Satellite System (GNSS). When an LTE and ISM radio of the UE operate on adjacent frequency bands (e.g., LTE radio operating on Band 40 (2300-2400 MHz) adjacent to an ISM band), the coexistence of the LTE and ISM radio in the UE may cause IDC interference each other. However, LTE transmission only gives interference to a GNSS reception when a GNSS receiver of the UE operates on a harmonic frequency band of the LTE radio.

In some implementations, an LTE radio in the UE may determine the cause of interference when the interference results from activating other radio technologies (e.g., ISM, GNSS) in the UE. In order to manage IDC interference, the UE may send an IDC indicator identifying the IDC interference to a base station. In response, the base station may allocate a FDM (e.g. Handover) or TDM (e.g. time resources sharing) solution. In doing so, the IDC interference in the UE may be minimized, eliminated, or otherwise reduced. In some implementations, a UE may indicate a preferred IDC solution (e.g., Time Division Multiplexing Hybrid Automatic Repeat Request (TDM-HARQ) solution, TDM Discontinuous Reception (TDM-DRX) solution, Frequency Division Multiplexing (FDM) solution) to the base station. Accordingly, the base station may provide the UE an IDC solution which is different from the preferred IDC solution indicated by the UE for IDC interference management.

To allow quick signaling of IDC information (e.g., IDC indication, IDC solution), the UE may use physical layer feedback mechanisms to transmit the IDC information. In some implementations, a UE can transmit the IDC information on a PUCCH using a PUCCH format 1a, 1b, 2, or 3. In such cases, the UE may transmit an IDC indicator using an orthogonal sequence. For example, the orthogonal sequence may be selected from a 4-by-4 Hadamard-Walsh code. The UE may also select an IDC solution and transmit the selected IDC solution as part of Channel Quality Indicator (CQI)/Precoding Matrix Indicator (PMI) information using a Reed-Muller (RM) code or other linear error-correcting codes. Alternatively or in addition, the IDC indicator or selected IDC solution may be multiplexed with CQI/PMI and transmitted using a PUCCH format 2 when no HARQ Acknowledgement (ACK)/Negative Acknowledgement (NACK) information is to be transmitted. Furthermore, the IDC indicator or selected IDC solution may be multiplexed with HARQ ACK/NACK or scheduling request (SR) and transmitted using a PUCCH format 3 by the UE.

In some implementations, a UE can transmit the IDC information on a PUCCH or a PUSCH using a cyclic shifted sequence from an IDC cyclic shifted sequence category. The cyclic shifted sequence category may be reserved for transmitting IDC information. For UEs that are not experiencing IDC interference, a cycle shifted sequence from a non-IDC cyclic shifted sequence category may be used. The use of cyclic shifted sequence may provide orthogonality among the transmitted sequences of UEs when more than one UE is scheduled to transmit on the same PUCCH resource blocks.

Thus, no additional uplink frequency resource may be needed for transmission of the IDC information on the PUCCH or PUSCH.

In some implementations, a UE can transmit the IDC information on a PUSCH by multiplexing the IDC information with HARQ ACK/NACK report, rank indication (RI) report, or CQI/PMI report. An IDC indicator or selected IDC solution may be transmitted on PUSCH by utilizing the reserved bits in a HARQ ACK/NACK report or RI report. Alternatively or in addition, the IDC indicator or selected IDC solution may be multiplexed with PMI/CQI payload bits and transmitted using a RM or tail-biting convolutional code. In such cases, the number of IDC bits to be encoded may be semi-statically configured by a higher layer or set during a connection initialization stage by the UE.

FIG. 1 is a schematic representation of an example wireless cellular communication system 100. The cellular network system 100 shown in FIG. 1 may include one or more base stations (i.e., 112a and 112b). In the LTE example of FIG. 1, the base stations are shown as evolved Node Bs (eNBs) 112a and 112b. It will be understood that the base station may operate in any mobile environment, including macro cell, femto cell, pico cell, or the base station may operate as a node that can relay signals for other mobile or base stations. The example LTE telecommunications environment 100 of FIG. 1 may include one or more radio access networks 110, core networks (CNs) 120, and external networks 130. In certain implementations, the radio access networks may be E-UTRANs. In addition, in certain instances, core networks 120 may be evolved packet cores (EPCs). Further, there may be one or more mobile electronic devices 102a, 102b operating within the LTE system 100. In some implementations, 2G/3G systems 140, e.g., Global System for Mobile communication (GSM), Interim Standard 95 (IS-95), Universal Mobile Telecommunications System (UMTS) and CDMA2000 (Code Division Multiple Access) may also be integrated into the LTE telecommunication system 100.

In the example LTE system shown in FIG. 1, the EUTRAN 110 includes eNB 112a and eNB 112b. Cell 114a is the service area of eNB 112a and Cell 114b is the service area of eNB 112b. UEs 102a and 102b operate in Cell 114a and are served by eNB 112a. The EUTRAN 110 can include one or more eNBs (i.e., eNB 112a and eNB 112b) and one or more UEs (i.e., UE 102a and UE 102b) can operate in a cell. The eNBs 112a and 112b communicate directly to the UEs 102a and 102b. In some implementations, the eNB 112a or 112b may be in a one-to-many relationship with the UEs 102a and 102b, e.g., eNB 112a in the example LTE system 100 can serve multiple UEs (i.e., UE 102a and UE 102b) within its coverage area Cell 114a, but each of UE 102a and UE 102b may be connected to one eNB 112a at a time. In some implementations, the eNBs 112a and 112b may be in a many-to-many relationship with the UEs, e.g., UE 102a and UE 102b can be connected to eNB 112a and eNB 112b. The eNB 112a may be connected to eNB 112b with which handover may be conducted if one or both of the UEs 102a and UE 102b travels from cell 114a to cell 114b. The UEs 102a and 102b may be any wireless electronic device used by an end-user to communicate, for example, within the LTE system 100. The UE 102a or 102b may be referred to as mobile electronic device, user device, mobile station, subscriber station, or wireless terminal. The UE 102a or 102b may be a cellular phone, personal data assistant (PDA), smart phone, laptop, tablet personal computer (PC), pager, portable computer, or other wireless communications device.

The UEs 102a and 102b may transmit voice, video, multimedia, text, web content and/or any other user/client-specific content. On the one hand, the transmission of some of these contents, e.g., video and web content, may require high channel throughput to satisfy the end-user demand. On the other hand, the channel between UEs 102a, 102b and eNBs 112a, 112b may be contaminated by multipath fading, due to the multiple signal paths arising from many reflections in the wireless environment. Accordingly, the UEs' transmission may adapt to the wireless environment. In short, the UEs 102a and 102b generate requests, send responses or otherwise communicate in different means with Evolved Packet Core (EPC) 120 and/or Internet Protocol (IP) networks 130 through one or more eNBs 112a and 112b.

In some implementations, a UE 102 may support multiple radio technologies in addition to LTE (e.g., Bluetooth, WLAN, GNSS) and may activate more than one of the multiple supported radio technologies simultaneously. The UE 102 may identify an existence of IDC interference due to the activation of more than one radio technology. In such case, the UE 102 may transmit an IDC indicator identifying the IDC interference or a selected IDC solution identifying a preferred IDC solution (e.g., TDM HARQ, TDM DRX, FDM) to its serving eNB, 112 via a physical layer uplink channel. In doing so, the UE 102 may quickly notify the eNB 112 about the interference caused by IDC and a preferred IDC solution identified by the UE such that the eNB 112 may adopt proper interference avoidance or mitigation schemes for the UE 102.

Examples of user equipment include, but are not limited to, a mobile phone, a smart phone, a telephone, a television, a remote controller, a set-top box, a computer monitor, a computer (including a tablet computer such as a BlackBerry® Playbook tablet, a desktop computer, a handheld or laptop computer, a netbook computer), a personal digital assistant (PDA), a microwave, a refrigerator, a stereo system, a cassette recorder or player, a DVD player or recorder, a CD player or recorder, a VCR, an MP3 player, a radio, a camcorder, a camera, a digital camera, a portable memory chip, a washer, a dryer, a washer/dryer, a copier, a facsimile machine, a scanner, a multi-functional peripheral device, a wristwatch, a clock, and a game device, etc. The UE 102a or 102b may include a device and a removable memory module, such as a Universal Integrated Circuit Card (UICC) that includes a Subscriber Identity Module (SIM) application, a Universal Subscriber Identity Module (USIM) application, or a Removable User Identity Module (R-UIM) application. Alternatively, the UE 102a or 102b may include the device without such a module. The term "UE" can also refer to any hardware or software component that can terminate a communication session for a user. In addition, the terms "user equipment," "UE," "user equipment device," "user agent," "UA," "user device," and "mobile device" can be used synonymously herein.

A radio access network is part of a mobile telecommunication system which implements a radio access technology, such as UMTS, CDMA2000 and 3GPP LTE. In many applications, the Radio Access Network (RAN) included in an LTE telecommunications system 100 is called an EUTRAN 110. The EUTRAN 110 can be located between the UEs 102a, 102b and EPC 120. The EUTRAN 110 includes at least one eNB 112a or 112b. The eNB can be a radio base station that may control all or at least some radio related functions in a fixed part of the system. The at least one eNB 112a or 112b can provide radio interface within their coverage area or a cell for the UEs 102a, 102b to communicate. The eNBs 112a and 112b may be distributed throughout the cellular network to provide a wide area of coverage. The eNBs 112a and 112b directly communicate with one or more UEs 102a, 102b, other eNBs, and the EPC 120.

In some implementations, an eNB 112 may receive an IDC indicator identifying the IDC interference or selected IDC solution from a UE 102. The IDC indicator or selected IDC solution may be received on a PUCCH or PUSCH resource. In some implementations, the eNB 112 may decode the IDC information by using a cyclic shifted sequence reserved for the IDC information, i.e., an IDC cyclic shifted sequence. Subsequently, the eNB 112 may perform interference avoidance or mitigation for the UE 102. For example, the eNB 112 may allocate different time or frequency resources to the UE 102 to manage IDC interference. In some instances, the eNB 112 may also handover the UE 112 to a different eNB that operates on a different frequency band to avoid the IDC interference at the UE 112. In some other instances, the eNB 112 may perform interference avoidance or mitigation using the selected IDC solutions indicated by the UE when multiple IDC solutions are available.

The eNBs 112a and 112b may be the end point of the radio protocols towards the UEs 102a, 102b and may relay signals between the radio connection and the connectivity towards the EPC 120. In certain implementations, the EPC 120 is the main component of a core network (CN). The CN can be a backbone network, which may be a central part of the telecommunications system. The EPC 120 can include a mobility management entity (MME), a serving gateway (SGW), and a packet data network gateway (PGW). The MME may be the main control element in the EPC 120 responsible for the functionalities comprising the control plane functions related to subscriber and session management. The SGW can serve as a local mobility anchor, such that the packets are routed through this point for intra EUTRAN 110 mobility and mobility with other legacy 2G/3G systems 140. The SGW functions may include the user plane tunnel management and switching. The PGW may provide connectivity to the services domain comprising external networks 130, such as the IP networks. The UEs 102a, 102b, EUTRAN 110, and EPC 120 are sometimes referred to as the evolved packet system (EPS). It is to be understood that the architectural evolvement of the LTE system 100 is focused on the EPS. The functional evolution may include both EPS and external networks 130.

Though described in terms of FIG. 1, the present disclosure is not limited to such an environment. In general, cellular telecommunication systems may be described as cellular networks made up of a number of radio cells, or cells that are each served by a base station or other fixed transceiver. The cells are used to cover different areas in order to provide radio coverage over an area. Example cellular telecommunication systems include Global System for Mobile Communication (GSM) protocols, Universal Mobile Telecommunications System (UMTS), 3GPP Long Term Evolution (LTE), and others. In addition to cellular telecommunication systems, wireless broadband communication systems may also be suitable for the various implementations described in the present disclosure. Example wireless broadband communication systems include IEEE 802.11 WLAN, IEEE 802.16 WiMAX network, etc.

Figure 2:
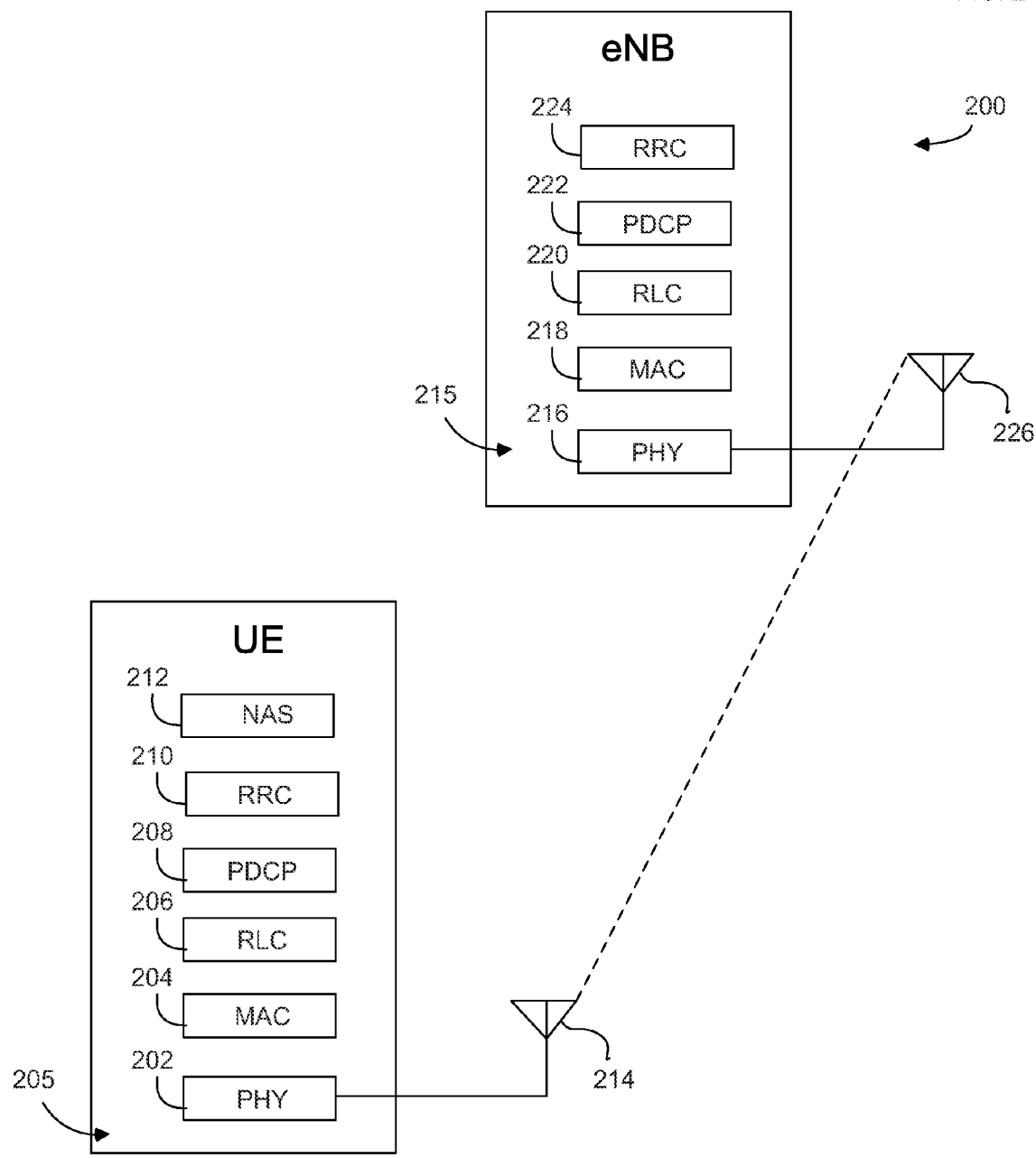
FIG. 2 is a schematic illustrating layers of an access node and user equipment in an example wireless communication network.

FIG. 2 is a schematic illustrating layers of an access node and user equipment in an example wireless communication network 200. The example wireless communication network 200 includes a UE 205 that can communicate wirelessly with an eNB 215. The eNB 215 can be referred to as a "network," "network component," "network element," "access node," or "access device." Although shown as two wireless communication devices (alternatively, referred to as "apparatuses" or "entities") 205, 215, the wireless communication network 200 can include or communicate with any other wireless communication devices without departing from the scope of this disclosure.

Each of the wireless communication devices 205, 215 includes a protocol stack for communications with other devices via wireless or wired connection. The protocol stack of the UE 205 can include a physical (PHY) layer 202, a medium access control (MAC) layer 204, a radio link control (RLC) layer 206, a packet data convergence protocol (PDCP) layer 208, a radio resource control (RRC) layer 210, and a non-access stratum (NAS) layer 212. The UE 205 may also include one or more antennas 214 coupled to the PHY layer 202. In the illustrated wireless communication network 200, a "PHY layer" can also be referred to as "layer 1." A MAC layer can also be referred to as "layer 2." The other layers (RLC layer, PDCP layer, RRC layer and above) can be collectively referred to as a "higher layer(s)."

The protocol stack of the eNB 215 can include a physical (PHY) layer 216, a medium access control (MAC) layer 218, a radio link control (RLC) layer 220, a packet data convergence protocol (PDCP) layer 222, and a radio resource control (RRC) layer 224. The eNB 215 may also include one or more antennas 226 coupled to the PHY layer 216.

Communications between the eNB 215 and the UE 205 can occur at the same protocol layer between the two devices. For example, communications can occur between the RRC layers 224, and 210 at the eNB 215 and the UE 205, respectively. On the transmission side, the eNB 215 can send RRC layer 224 information, which travels through the PDCP layer 222, the RLC layer 220, and the MAC layer 218, and is sent over the PHY layer 216 through an antenna 226 to the UE 205. On the reception side, the UE 205 can receive the information on the PHY layer 202 using an antenna 214, and deliver the information through the MAC layer 204, the RLC layer 206, and the PDCP layer 208 to the RRC layer 210. Such communications are generally done by using a communications subsystem and a processor, as described in more details with regard to FIG. 3 and FIG. 4.

The various implementation of the disclosure can be implemented by a UE or an eNB on any one or a combination of layers described above in connection with FIG. 2. For example, the IDC interference detection and IDC information transmission may be performed by the PHY layer 202 of the UE 205. The selection of preferred IDC solution may be performed by the MAC layer 204 or RRC layer 210 of the UE 205. For another example, the IDC information reception and decoding may be performed by the PHY layer 216 of the eNB 215. The selection of IDC interference avoidance or mitigation scheme may be performed by the RRC layer 224 of the eNB 215. The time and frequency resource allocation for the UE 205 may be performed by the MAC layer 218 of the eNB 215.

Figure 3:
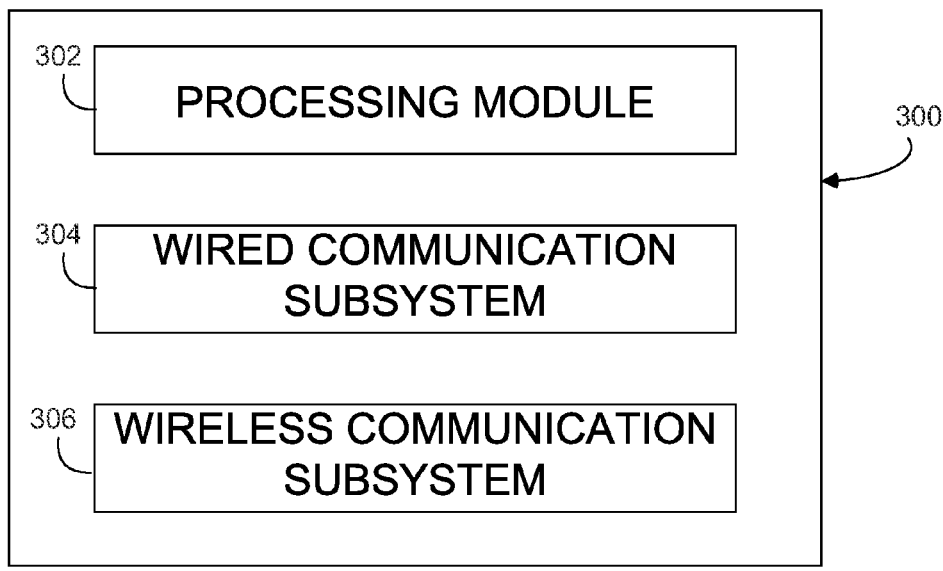
FIG. 3 is a schematic illustrating an example access node device.

FIG. 3 is a schematic illustrating an example access node device 300. The example access node device 300 includes a processing module 302, a wired communication subsystem 304, and a wireless communication subsystem 306. The processing module 302 can include one or more processing components (alternatively referred to as "processors" or "central processing units" (CPUs)) operable to execute instructions associated with managing IDC interference. The processing module 302 can also include other auxiliary components, such as random access memory (RAM), read only memory (ROM), secondary storage (for example, a hard disk drive or flash memory). The processing module 302 can form at least part of the layers described above in connection with FIG. 2. For example, the processing module 302 may be configured to receive IDC information (e.g., IDC indicator, selected IDC solution) from a UE on a physical layer uplink channel (e.g., PUCCH, PUSCH). The processing module 302 may also be configured to decode the IDC indicator or selected IDC solution by using a Hadamard-Walsh code, a RM code, or a convolutional code. In some implementations, the processing module 302 may be configured to decode the IDC indicator or selected IDC solution using a cyclic shifted sequence included in an IDC cyclic shifted sequence category. Furthermore, the processing module 302 may be configured to determine an IDC interference avoidance or mitigation scheme based on received selected IDC solution by the UE and execute an IDC interference avoidance or mitigation operation. The processing module 302 can execute certain instructions and commands to provide wireless or wired communication, using the wired communication subsystem 304 or a wireless communication subsystem 306. A skilled artisan will readily appreciate that various other components can also be included in the example access node device 300.

Figure 4:
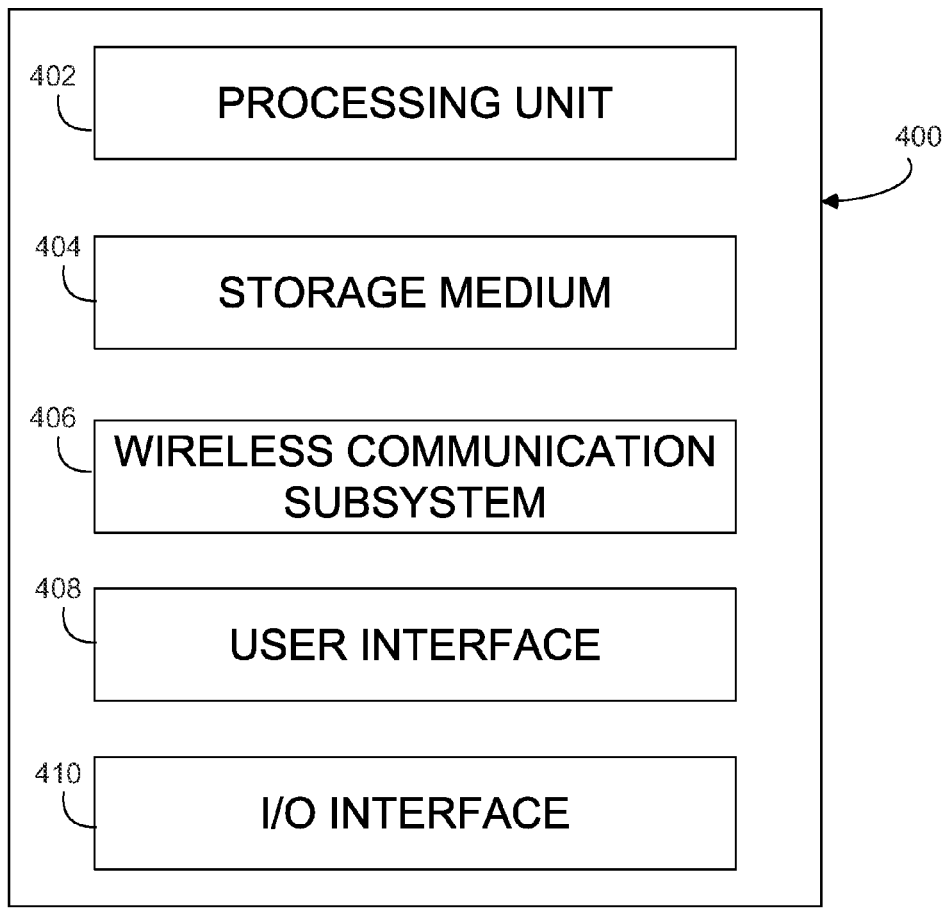
FIG. 4 is a schematic illustrating an example user equipment device.

FIG. 4 is a schematic illustrating an example UE device 400. The example user equipment device 400 includes a processing unit 402, a computer readable storage medium 404 (for example, ROM or flash memory), a wireless communication subsystem 406, a user interface 408, and an I/O interface 410.

The processing unit 402 may include components and perform functionalities similar to the processing module 302 described with regard to FIG. 3. Moreover, the processing unit 402 may be configured to transmit an IDC indicator or selected IDC solution using different PUCCH formats on PUCCH resource or different modulation orders or different control formats on PUSCH resource. In some implementations, the processing unit 402 may use a cyclic shifted sequence included in an IDC cyclic shifted sequence category to transmit the IDC indicator or selected IDC solution.

The wireless communication subsystem 406 may be configured to provide wireless communications for data information or control information provided by the processing unit 402. The wireless communication subsystem 406 can include, for example, one or more antennas, a receiver, a transmitter, a local oscillator, a mixer, and a digital signal processing (DSP) unit. In some embodiments, the wireless communication subsystem 406 can support multiple input multiple output (MIMO) transmissions.

The user interface 408 can include, for example, one or more of a screen or touch screen (for example, a liquid crystal display (LCD), a light emitting display (LED), an organic light emitting display (OLED), a microelectromechanical system (MEMS) display), a keyboard or keypad, a trackball, a speaker, and a microphone. The I/O interface 410 can include, for example, a universal serial bus (USB) interface. A skilled artisan will readily appreciate that various other components can also be included in the example UE device 400.

Figure 5:
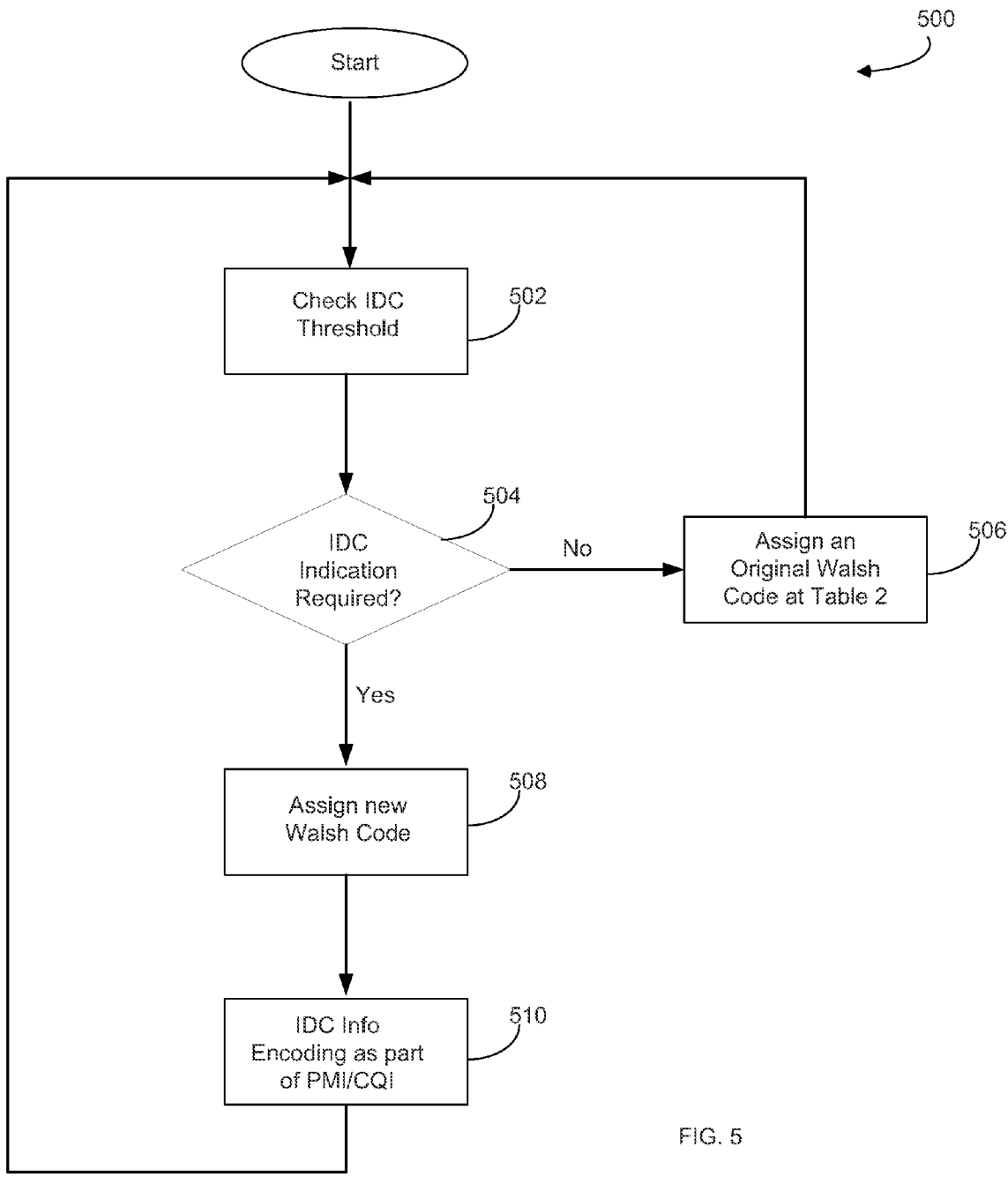
FIG. 5 is a flow chart illustrating an example process of transmitting IDC information on a physical layer uplink control channel (PUCCH) in a UE.

FIG. 5 is a flow chart 500 illustrating an example process of transmitting IDC information on a PUCCH. Transmitting IDC information on a PUCCH allows quick signaling of the IDC interference to an eNB for interference mitigation. The example process 500 may include using a PUCCH format 1a, 1b or 2 to transmit, by a UE, IDC information. The PUCCH formats can use a cell specific cyclic shifted sequence that varies with a symbol number and a slot number to provide orthogonality among PUCCH transmissions from different UEs. An example of physical layer transmission schemes with different PUCCH formats is illustrated in Table 1. As shown in Table 1, IDC information may be transmitted using PUCCH format 1a, 1b, or 2 with other uplink control information (e.g., HARQ ACK/NACK, SR, or Channel State Information (CSI), such as CQI or PMI).

TABLE 1

PUCCH formats

| PUCCH format | Modulation scheme | Number of bits per subframe, $M_{bit}$ | Uplink control information |
|---|---|---|---|
| 1 | N/A | N/A | SR |
| 1a | BPSK | 1 | HARQ-ACK/NAC with(out) SR, IDC info |
| 1b | QPSK | 2 | HARQ-ACK/NAC with(out) SR, IDC info |
| 2 | QPSK | 20 | CSI, IDC info |
| 2a | QPSK + BPSK | 21 | CSI and 1-bit HARQ-ACK/NACK |
| 2b | QPSK + QPSK | 22 | CSI and 2-bit HARQ-ACK/NACK |
| 3 | QPSK | 48 | Multiple ACK/NACKs for carrier aggregation: up to 20 ACK/NACK bits + optional SR, IDC info |

To identify whether an IDC indication is to be transmitted, the UE may first determine an IDC interference level and compare the determined IDC interference level with an IDC threshold at step 502. The IDC threshold may be pre-configured at the UE. The UE then identifies whether to transmit an IDC indicator based on the determined IDC interference level and the IDC threshold at step 504. If the determined IDC interference level is greater than the IDC threshold, the UE may transmit an IDC indicator to the base station, and the example process 500 proceeds to step 508. Otherwise, the UE may not transmit the IDC indicator, and the UE may proceed to step 506, where the UE may assign an original Hadamard-Walsh code to transmit other uplink control information. The original Hadamard-Walsh code may be an orthogonal sequence selected from a 4-by-4 Hadamard-Walsh orthogonal code as illustrated in Table 2.

TABLE 2

Original orthogonal sequences

| Sequence index | Orthogonal sequences |
|---|---|
| 0 | [+1 +1 +1 +1] |
| 1 | [+1 −1 +1 −1] |
| 2 | [+1 −1 −1 +1] |

At step 508, the UE may assign a new Hardamard-Walsh orthogonal sequence for the IDC indicator indicating an existence of IDC interference. In some implementations, the IDC indicator may be a one-bit indicator as illustrated in Table 3. The new Hardamard-Walsh orthogonal sequence for the IDC indicator may be chosen from a $4^{th}$ row of the 4-by-4 Hadamard-Walsh code, i.e., [+1 +1 −1 −1]. Therefore, by using the new Hardamard-Walsh orthogonal sequence, the UE may transmit the IDC indicator on the assigned PUCCH resource without requesting additional PUCCH resources.

TABLE 3

One-bit IDC indicator

| IDC Value | Bit |
|---|---|
| No IDC | 0 |
| IDC | 1 |

After the IDC indicator is transmitted using the new Hardamard-Walsh code, the UE may multiplex a selected IDC solution with PMI/CQI and transmit them using an RM code at step 510. As such, no additional PUCCH resource may be requested to transmit the selected IDC solution. In some implementations, a PUCCH format 2 (shown in Table 1) may be used to transmit the selected IDC solution with PMI/CQI. The selected IDC solution may be represented by a two-bit IDC signaling as illustrated in Table 4. The RM code may be listed as RM (d, A), where d is the length of the encoded bits and A determines the length of the input IDC information bits. In some implementations, the RM code to encode the selected IDC solution may be an RM (20, A) code, where A may be the number of input bits that is up to 13 bits, including the two bits for the selected IDC solution when no HARQ ACK/ANACK is to be transmitted. In some implementations, the selected IDC solution by the UE may not be transmitted, and the extra two bits for the selected IDC solution may not be appended with the PMI/CQI. As such, the RM code performance may be improved since a shorter length of IDC information bits is used. On the network side, an eNB may receive the IDC information with PUCCH format of 1a, 1b or 2. The eNB may subsequently determine an IDC interference avoidance or mitigation solution for the UE.

TABLE 4

UE selected IDC solution bit mapping

| IDC Value | Bits |
| --- | --- |
| Reserved | 00 |
| TDM-HARQ | 01 |
| TDM-DRX | 10 |
| FDM | 11 |

Figure 6:
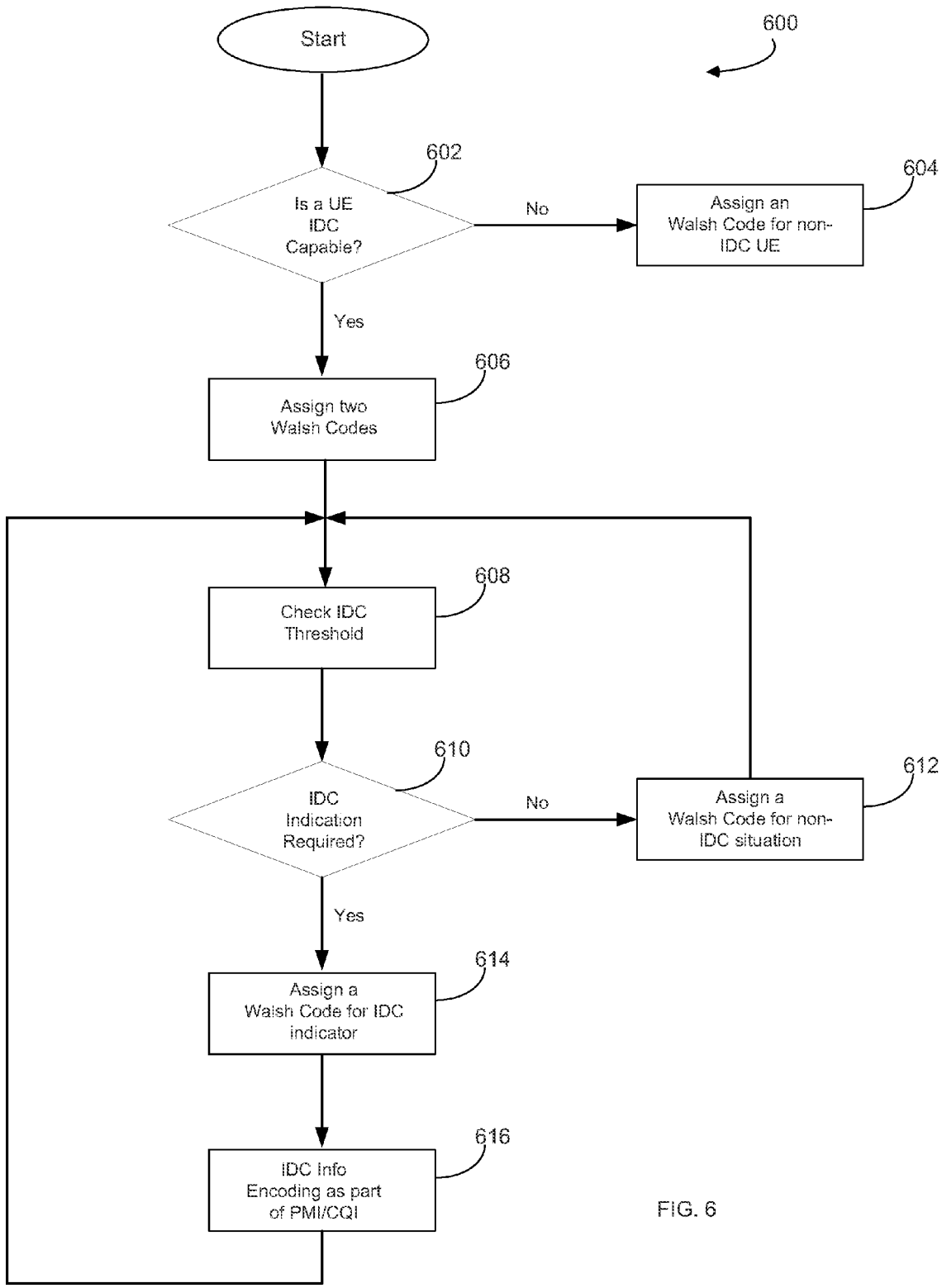
FIG. 6 is a flow chart illustrating another example process of transmitting IDC information on a PUCCH in a UE.

FIG. 6 is a flow chart 600 illustrating another example process 600 for transmitting IDC information on a PUCCH. Similar to the example process described with regard to FIG. 5, the example process 600 may include using a PUCCH format 1a, 1b or 2 to transmit IDC information by a UE. At step 602, the UE checks whether it is IDC capable, e.g., the UE supports LTE and non-LTE radios, and is also capable of IDC operations. If yes, two Hadamard-Walsh codes may be assigned at step 606. Otherwise, a Hadamard-Walsh code may be assigned for the transmission of other uplink control information (e.g., HARQ ACK/NACK, SR, or CQI/PMI) at step 604. In some implementations, the assignments may be made by the explicit signaling or pre-configured settings. The two Hadamard-Walsh codes may be selected from a 4-by-4 Hadamard-Walsh codes as illustrated in Table 5. The orthogonal sequences shown in Table 5 include the orthogonal sequences shown in Table 3 and an additional orthogonal sequence (i.e., [+1 +1 −1 −1]).

TABLE 5

Expanded orthogonal sequences

| Sequence index | Orthogonal sequences |
| --- | --- |
| 0 | [+1 +1 +1 +1] |
| 1 | [+1 −1 +1 −1] |
| 2 | [+1 −1 −1 +1] |
| 3 | [+1 +1 −1 −1] |

At step 608, the UE may determine an IDC interference level and check for an IDC threshold. In some instances, the IDC threshold may be pre-configured at the UE. At step 610, the UE determines whether an IDC indication is to be transmitted based on comparing the determined IDC interference level to the IDC threshold. If the determined IDC interference level is greater than the IDC threshold, the UE may determine that an IDC indication is to be transmitted to a base station, and the example process 600 proceeds to 614. Otherwise, the UE may transmit IDC indication, and the example process 600 proceeds to step 612, where the UE may assign one Hadamard-Walsh code for the non-IDC situation from the two Hadmard-Walsh codes.

At step 614, the UE may assign a Hadmard-Walsh code from the two Hadmard-Walsh codes for the IDC indicator. The Hadmard-Walsh code assigned at step 614 may be different from the one assigned at step 612. In some implementations, the IDC indicator may be a one-bit indicator as illustrated in Table 3. After the IDC indicator is transmitted, the selected IDC solution may be multiplexed with PMI/CQI and encoded using a RM code at step 616. The operations at step 616 may be similar to the operation at 510 described with regard to FIG. 5.

On the network side, an eNB may receive the IDC information on the PUCCH by using a format of 1a, 1b or 2. The eNB may subsequently determine an IDC interference avoidance or mitigation scheme for the UE and execute an interference avoidance or mitigation operation.

Figure 7:
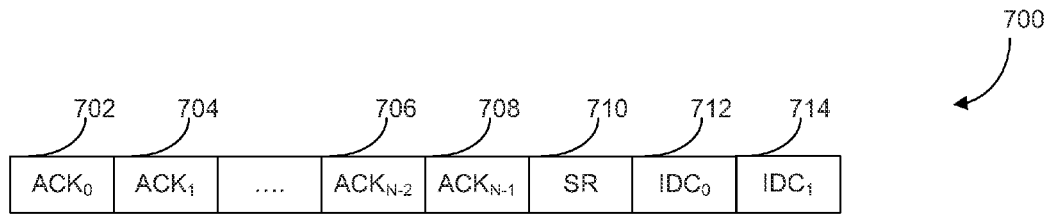
FIG. 7 is a schematic illustrating an example format for transmitting IDC information on a PUCCH in a UE.

FIG. 7 is a schematic illustrating an example format 700 for transmitting IDC information on a PUCCH. As shown in FIG. 7, HARQ ACK/NACK information 702-708 and SR 710 may be multiplexed with IDC information 712-714. In 706-708, N represents the number of ACK/NACK bits to be transmitted. The IDC information 712-714 may be appended at the end of the concatenated bits after HARQ ACK/NACK and SR. In some implementations, the SR may not be transmitted. Accordingly, the IDC information 712-714 may be multiplexed with HARQ ACK/NACK information. The IDC information 712-714 may include an IDC indicator (as shown in Table 3) or a selected IDC solution (as shown in Table 3). A PUCCH format 3 (as shown in Table 1) may be used to transmit the multiplexed IDC information, HARQ ACK/NACK or SR. By multiplexing the IDC information with ACK/NACK or SR, PUCCH resources may be efficiently utilized since no extra PUCCH resource is used for the transmission of IDC information. Corresponding to the UE operation shown in FIG. 7, an eNB may receive the IDC information on the PUCCH by using a format of 3. The eNB may decode the IDC information by using the RM code. The eNB may subsequently determine an IDC interference avoidance or mitigation scheme for the UE and execute an interference avoidance or mitigation operation.

Figure 8:
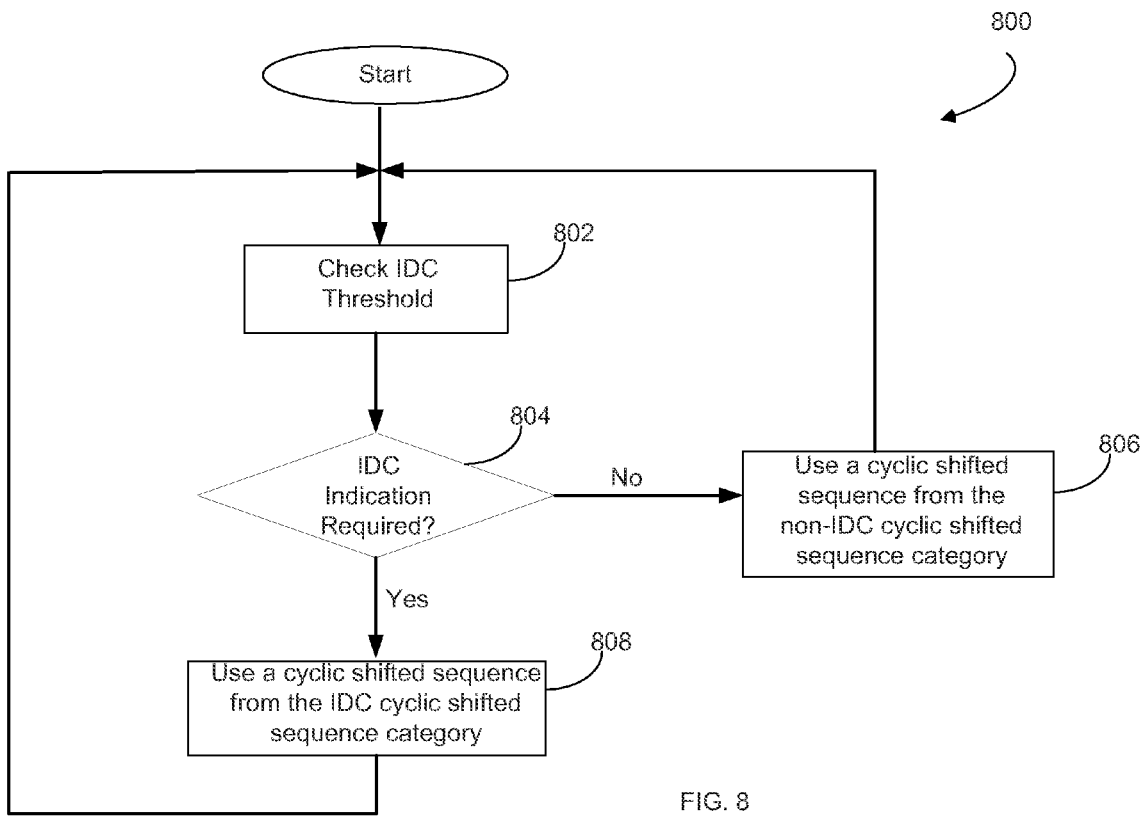
FIG. 8 is a flow chart illustrating an example process of transmitting IDC information on a physical layer uplink channel in a UE.

FIG. 8 is a flow chart 800 illustrating an example process 800 of transmitting IDC information on a physical layer uplink channel. The physical layer uplink channel may be a PUCCH or a PUSCH. At step 802, the UE may determine an IDC interference level and check an IDC threshold. The IDC threshold may be pre-configured at the UE or signaled by an eNB. At step 804, the UE identifies whether an IDC indication is to be transmitted based on comparing the determined IDC interference level to the IDC threshold. If the determined IDC interference level is greater than the IDC threshold, the UE may transmit an IDC indicator to the eNB, and the example process 800 proceeds to 808. Otherwise, the UE may not transmit the IDC indicator, and the example process proceeds to step 806, where the UE uses a cyclic shifted sequence included in a non-IDC cyclic shifted sequence category for transmitting the IDC information. Cyclic shifted sequences included in the non-IDC cyclic shifted sequence category may be orthogonal sequences, such that they can be transmitted by different UEs at the same channel resources without interfering with each other. The IDC information bits may be mapped into modulation symbols and then multiplied with the cyclic shifted sequence. In some implementations, a cyclic shifted sequence of length 12 may be used for physical layer uplink channels.

At step 808, the UE may use a cyclic shifted sequence from an IDC cyclic shifted sequence category for transmitting the IDC information. In some implementations, one or more cyclic shifted sequences may be reserved and included in the IDC cyclic shifted sequence category. The one or more cyclic shifted sequences may be pre-defined and stored at an eNB. The eNB may transmit the one or more shifted sequences to the UE via broadcast signaling or dedicated signaling. The categorization of cyclic shifted sequences may allow UEs to transmit IDC information using allocated physical layer uplink resource without requesting additional frequency resources. The example process 800 may be performed on a PUCCH or a PUSCH.

On the network side, an eNB may receive the IDC information on the PUCCH or PUSCH by using a cyclic shifted sequence included from the IDC cyclic shifted sequence category. The eNB may subsequently determine an IDC interference avoidance or mitigation scheme for the UE and execute an interference avoidance or mitigation operation.

Figure 9:
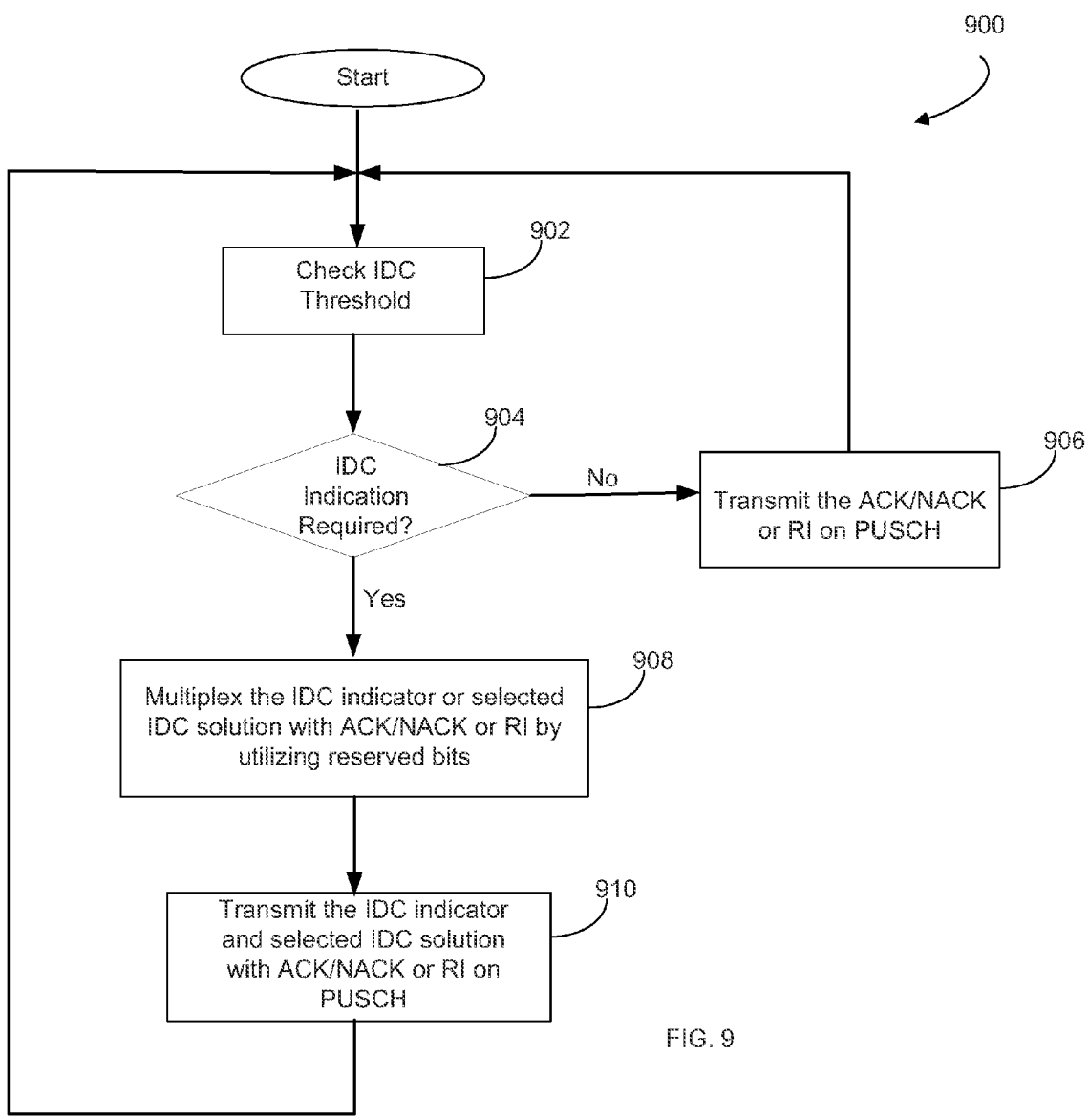
FIG. 9 is a flow chart illustrating an example process of transmitting IDC information on a physical layer uplink shared channel (PUSCH) in a UE.

FIG. 9 is a flow chart illustrating an example process 900 of transmitting IDC information on a PUSCH. At step 902, the UE may determine an IDC interference level and check an IDC threshold. The IDC threshold may be pre-configured at the UE or signaled by an eNB. At step 904, the UE identifies whether an IDC indication is to be transmitted based on comparing the determined IDC interference level to the IDC threshold. If the determined IDC interference level is greater than the IDC threshold, the UE may transmit an IDC indicator to the eNB, and the example process 900 proceeds to 908. Otherwise, the UE may not transmit the IDC indicator, and the example process proceeds to step 906, where the UE may transmit other control information (e.g., ACK/NACK, or RI) on PUSCH.

At step 908, the UE may multiplex the IDC indicator or selected IDC solution with the ACK/NACK or RI information by using reserved bits. Table 6 illustrates an example of reserved bits for encoding of a one-bit HARQ ACK/NACK. As shown in Table 6, $Q_m$ represents a modulation order of a given transport block, $o_0^{ACK}$ represents a first encoded ACK/NACK bit, and x, y represent placeholders that are reserved in order to maximize the Euclidean distance of the modulation symbols. In some instances, the reserved bits x, y may be used to transmit IDC information (e.g., IDC indicator or selected IDC solutions). For example, a one-bit IDC indicator (as shown in Table 3) may be transmitted with the encoded ACK/NACK bit using a modulation order of 2. The two-bit selected IDC solution (as shown in Table 4) may be transmitted in two consecutive HARQ ACK/NACK reports using a modulation order of 2. As shown in Table 6, more reserved bits are available for a modulation order of 4 and 6. Correspondingly, more IDC information bits may be transmitted with the encoded ACK/NACK bit using the modulation order of 4 or 6.

TABLE 6

Encoding of a 1-bit HARQ ACK/NACK

| $Q_m$ | Encoded HARQ-ACK/NACK |
|---|---|
| 2 | $[o_0^{ACK} y]$ |
| 4 | $[o_0^{ACK} y x x]$ |
| 6 | $[o_0^{ACK} y x x x x]$ |

Table 7 illustrates an example of reserved bits for the encoding of a 2-bit HARQ ACK/NACK. In Table 7, $o_0^{ACK}$ represents a ACK/NACK bit for codeword 0, $o_1^{ACK}$ represents a ACK/NACK bit for codeword 1, $o_2^{ACK} = (o_0^{ACK} + o_1^{ACK})$ mod 2, and x represents the reserved bits to maximize the Euclidean distance between modulation symbols. Similar to the 1-bit HARQ ACK/NACK encoding case, the reserved bits for the encoding of 2-bit HARQ ACK/NACK may be used to transmit IDC information. For the example illustrated in Table 7, one or more reserved bits are available to transmit IDC information for a modulation order of 4 and a modulation order of 6. The UE may transmit the IDC indicator or selected IDC solution using the available reserved bits.

TABLE 7

Encoding of a 2-bit HARQ ACK/NACK

| $Q_m$ | Encoded HARQ-ACK/NACK |
|---|---|
| 2 | $[o_0^{ACK} o_1^{ACK} o_2^{ACK} o_0^{ACK} o_1^{ACK} o_2^{ACK}]$ |
| 4 | $[o_0^{ACK} o_1^{ACK} x x o_2^{ACK} o_0^{ACK} x x o_1^{ACK} o_2^{ACK} x x]$ |
| 6 | $[o_0^{ACK} o_1^{ACK} x x x x o_2^{ACK} o_0^{ACK} x x x x o_1^{ACK} o_2^{ACK} x x x x]$ |

In some implementations, the IDC information may also be transmitted using reserved bits for encoding of a 1-bit or 2-bit RI. Table 8 and 9 illustrate examples of reserved bits for the encoding of a 1-bit RI and 2-bit RI, respectively. Similar to the encoding of HARQ ACK/NACK, reserved bits x, y in the encoded RI may be used to transmit IDC information.

TABLE 8

Encoding of a 1-bit RI

| $Q_m$ | Encoded RI |
|---|---|
| 2 | $[o_0^{RI} y]$ |
| 4 | $[o_0^{RI} y x x]$ |
| 6 | $[o_0^{RI} y x x x x]$ |

TABLE 9

Encoding of a 2-bit RI

| $Q_m$ | Encoded RI |
|---|---|
| 2 | $[o_0^{RI} o_1^{RI} o_2^{RI} o_0^{RI} o_1^{RI} o_2^{RI}]$ |
| 4 | $[o_0^{RI} o_1^{RI} x x o_2^{RI} o_0^{RI} x x o_1^{RI} o_2^{RI} x x]$ |
| 6 | $[o_0^{RI} o_1^{RI} x x x x o_2^{RI} o_0^{RI} x x x x o_1^{RI} o_2^{RI} x x x x]$ |

As shown in Table 8, a one-bit IDC indicator (as shown in Table 3) may be transmitted with the encoded RI bit using a modulation order of 2. The two-bit selected IDC solution (as shown in Table 4) may be transmitted in two consecutive RI reports using a modulation order of 2. More reserved bits are available for a modulation order of 4 and 6. Correspondingly, more IDC information bits may be transmitted with the encoded RI bit using a modulation order of 4 or 6. In Table 9, one or more reserved bits are available to transmit IDC information for a modulation order of 4 and a modulation order of 6. The UE may transmit the IDC indicator (illustrated in Table 3) or selected IDC solution (illustrated in Table 4) with the encoded RI using the available reserved bits.

At step 910, the UE may map the multiplexed encoded bits to modulation symbols and transmit the modulated IDC information with ACK/NACK or RI on a PUSCH. In some instances, by using the reserved bits in encoded ACK/NACK or RI report, the UE may transmit the IDC information to an eNB in a timely fashion without requesting additional frequency resource on the PUSCH.

On the network side, an eNB may receive the IDC information on the PUSCH with the ACK/NACK or RI information. The eNB may subsequently determine an IDC interference avoidance or mitigation scheme for the UE and execute an interference avoidance or mitigation operation.

Figure 10:
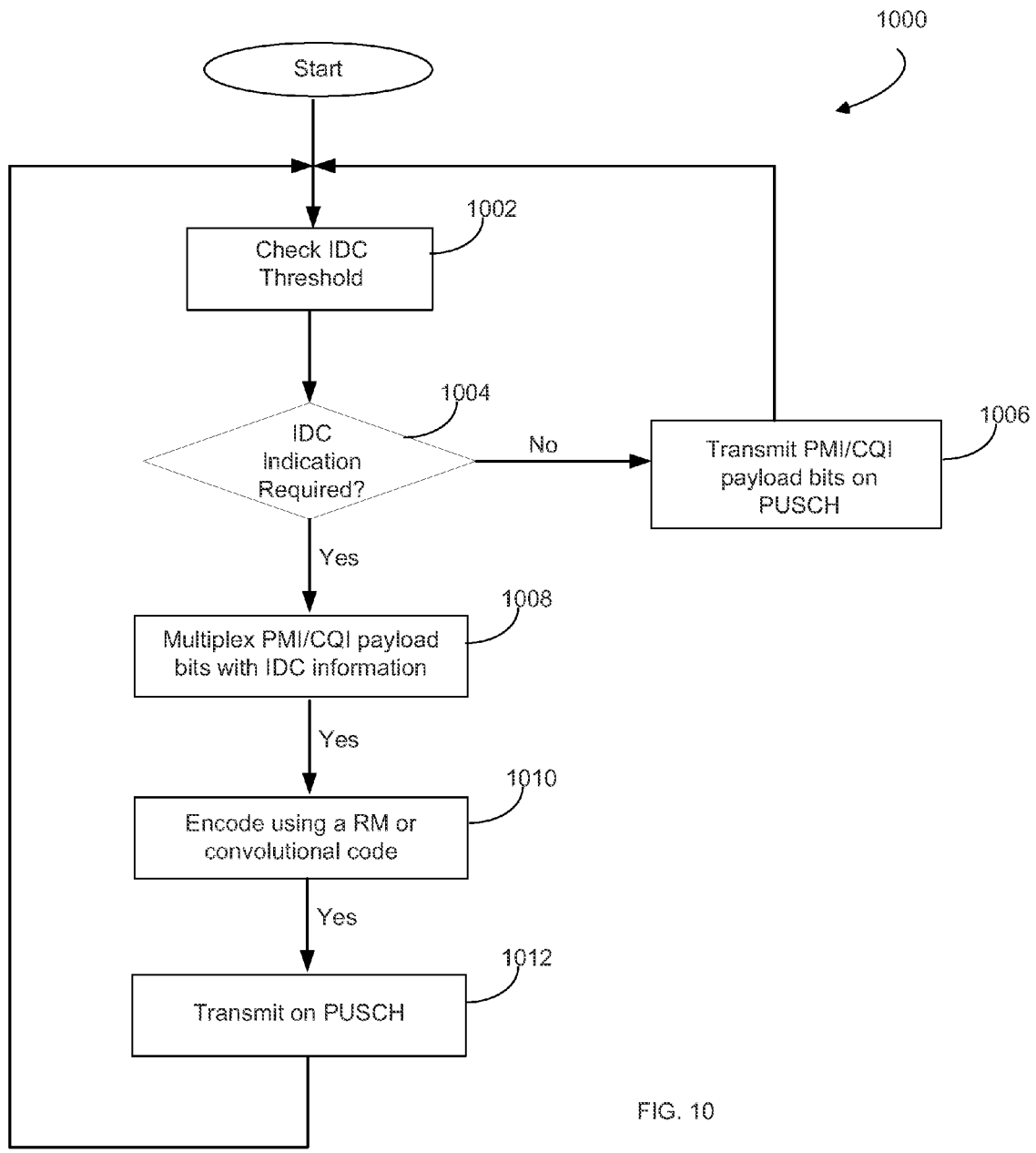
FIG. 10 is a flow chart illustrating another example process of transmitting IDC information on a PUSCH in a UE.

FIG. 10 is a flow chart 1000 illustrating another example process of transmitting IDC information on a PUSCH. At step 1002, the UE may determine an IDC interference level and check an IDC threshold. The IDC threshold may be pre-configured at the UE or signaled by an eNB. At step 1004, the UE identifies whether an IDC indication is to be transmitted based on comparing the determined IDC interference level to the IDC threshold. If the determined IDC interference level is greater than the IDC threshold, the UE may transmit an IDC indicator to the eNB, and the example process 1000 proceeds to step 1008. Otherwise, the UE may not transmit the IDC indicator, and the example process proceeds to step 1006, where the UE may transmit PMI/CQI payload bits on the PUSCH using a RM code or tail-biting convolutional code. In some implementations, a RM code may include 32 encoded bits and a number of input bits, O, that is less than or equal to 11, which may in turn, be expressed as RM (32, O). The RM code may be used for the encoding of PMI/CQI information on the PUSCH.

At step 1008, the UE may multiplex the PMI/CQI payload bits with IDC information. In some implementations, the IDC information may include a 1-bit IDC indicator (as shown in Table 3), a 2-bit selected IDC solution (as shown in Table 4), or both. The number of IDC bits to be encoded may be semi-statically configured by a higher layer or it may be set during a connection initialization stage. At step 1010, the UE may encode the multiplexed IDC information and PMI/CQI report using a RM or tail-biting convolutional code. In some implementations, a RM code is used when the number of input bits for PMI/CQI is less than or equal to 11. In some other implementations, the PMI/CQI payload bits and IDC information may be encoded using a tail-biting convolutional code, such as a rate 1/3 tail-biting convolutional code. At step 1012, the UE transmits the PMI/CQI and IDC information on PUSCH after encoding the information and mapping the encoded information bits to modulation symbols. By multiplexing the IDC information with PMI/CQI reports and transmitting them on the PUSCH, the UE may quickly notify the eNB about the IDC interference. Furthermore, no additional PUSCH resource may be needed for the transmission of IDC information and no additional delay for transmitting other control information is resulted from the transmission of IDC information.

On the network side, an eNB may receive the IDC information on the PUSCH with the PMI/CQI information. The eNB may decode the IDC information by using a RM code or a tail-biting convolutional code. The eNB may subsequently determine an IDC interference avoidance or mitigation scheme for the UE and execute an interference avoidance or mitigation operation. For example, an explicit signaling could be sent to the UE notifying the interference mitigation solution and the relevant parameters.

Table 10 is a schematic showing a proposed example change request (CR) to the 3rd Generation Partnership Project (3GPP) standard technical specification (TS) 36.213, "Physical Layer Procedures." As shown in Table 10, a new subsection "UE physical procedure for BT identification & notification" is proposed to be added to the current technical specification. According to the text included in the example CR in Table 10, IDC information may be transmitted on a PUCCH or a PUSCH channel. The example CR shown in Table 10 is for the purpose of illustration, additional, less, or alternative text may be used according to one or more of the various implementations of the present disclosure.

TABLE 10

Text proposal example for TS36.213
Proposed CR on TS36.213
UE physical procedure for BT identification & notification
When BT component in the in-device coexistence (IDC) is enabled, the UE shall measure RSSI every X subframe, where X is configured by eNB. The UE sends the IDC indicator to higher layer if measured RSSI is larger than the pre-determined threshold. Then, the UE shall decide an appropriate IDC depending on the availability of the supportable IDC solution, such as FDM, TDM-DRX, or TDM-HARQ to send IDC information to the serving eNB. The IDC information is given in the following table.
Table: IDC information & symbol mapping

| IDC Value | Bits | Symbol |
|---|---|---|
| Reserved | 00 | 1 |
| TDM-HARQ | 01 | −j |
| TDM-DRX | 10 | j |
| FDM | 11 | −1 |

When IDC is detected, IDC information at Table above shall be mapped on the physical uplink control channel (PUCCH) or physical uplink shared channel (PUSCH) when the channel status report or the downlink HARQ information is transmitted.

While several implementations have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

While the above detailed description has shown, described, and pointed out the fundamental novel features of the disclosure as applied to various implementations, it will be understood that various omissions and substitutions and changes in the form and details of the system illustrated may be made by those skilled in the art, without departing from the intent of the disclosure.

What is claimed is:

1. A method for managing interference with user equipment (UE), comprising:
    identifying in-device coexistence (IDC) interference; and
    transmitting, to a base station, an IDC indicator identifying the IDC interference on a physical layer uplink channel, wherein the IDC indicator is multiplexed with at least one of a channel quality indicator (CQI), a precoding matrix indicator (PMI), a hybrid automated repeat request (HARQ) acknowledgement/non-acknowledgement (ACK/NACK) signal, a scheduling request (SR), or a rank indicator (RI).

2. The method of claim 1, further comprising transmitting, to the base station, a selected IDC solution on the physical layer uplink channel.

3. The method of claim 1, wherein the physical layer uplink channel is a physical uplink control channel (PUCCH).

4. The method of claim 3, wherein the IDC indicator is transmitted on the PUCCH using an orthogonal sequence.

5. The method of claim 4, wherein the orthogonal sequence is generated based on a Hadamard-Walsh code.

6. The method of claim 3, further comprising transmitting a selected IDC solution using a Reed Muller code.

7. The method of claim 3, wherein the IDC indicator is multiplexed with at least one of a channel quality indicator (CQI) using a PUCCH format 2 or a precoding matrix indicator (PMI) using a PUCCH format 2.

8. The method of claim 3, wherein the IDC indicator is multiplexed with at least one of a hybrid automated repeat request (HARQ) acknowledgment/non-acknowledgment (ACK/NACK) signal using a PUCCH format 3 or a scheduling request (SR) using a PUCCH format 3.

9. The method of claim 3, wherein the IDC indicator is transmitted on the PUCCH using a cyclic shifted sequence included in an IDC cyclic shifted sequence category.

10. The method of claim 1, wherein the physical layer uplink channel is a physical uplink shared channel (PUSCH).

11. The method of claim 10, wherein the IDC indicator is multiplexed with an ACK/NACK signal on the PUSCH.

12. The method of claim 11, wherein the IDC indicator and the ACK/NACK signal are transmitted using a modulation order of 2, 4, or 6.

13. The method of claim 11, further comprising transmitting a selected IDC solution on the PUSCH at a time that is substantially similar to a time the IDC indicator and the ACK/NACK signal are transmitted.

14. The method of claim 10, wherein the IDC indicator is multiplexed with a rank indicator (RI) on the PUSCH.

15. The method of claim 14, wherein the IDC indicator and the RI are transmitted using a modulation order of 2, 4, or 6.

16. The method of claim 14, further comprising transmitting a selected IDC solution on the PUSCH at a time that is substantially similar to a time the IDC indicator and the RI are transmitted.

17. The method of claim 10, wherein the IDC indicator is multiplexed with at least one of a channel quality indicator (CQI) or a precoding matrix indicator (PMI) on the PUSCH.

18. The method of claim 17, wherein the IDC indicator is encoded using a Reed-Muller code or a tail biting convolutional code.

19. The method of claim 10, wherein the IDC indicator is transmitted on the PUSCH using a cyclic shifted sequence included in an IDC cyclic shifted sequence category.

20. The method of claim 1, wherein the IDC indicator is a one-bit indicator indicating an existence of IDC interference to the base station.

21. A user equipment (UE) comprising one or more processors configured to:
identify in-device coexistence (IDC) interference; and
transmit, to a base station, an IDC indicator identifying the IDC interference on a physical layer uplink channel, wherein the IDC indicator is multiplexed with at least one of a channel quality indicator (CQI), a precoding matrix indicator (PMI), a hybrid automated repeat request (HARQ) acknowledgement/non-acknowledgement (ACK/NACK) signal, a scheduling request (SR), or a rank indicator (RI).

22. The user equipment of claim 21, the one or more processors further configured to transmit, to the base station, a selected IDC solution on the physical layer uplink channel.

23. The user equipment of claim 21, wherein the physical layer uplink channel is a physical uplink control channel (PUCCH).

24. The user equipment of claim 23, wherein the IDC indicator is transmitted on the PUCCH using an orthogonal sequence.

25. The user equipment of claim 24, wherein the orthogonal sequence is generated based on a Hadamard-Walsh code.

26. The user equipment of claim 23, the one or more processors further configured to transmit a selected IDC solution using a Reed Muller code.

27. The user equipment of claim 23, wherein the IDC indicator is multiplexed with at least one of a channel quality indicator (CQI) using a PUCCH format 2 or a precoding matrix indicator (PMI) using a PUCCH format 2.

28. The user equipment of claim 23, wherein the IDC indicator is multiplexed with at least one of a hybrid automated repeat request (HARQ) acknowledgment/non-acknowledgment (ACK/NACK) signal using a PUCCH format 3 or a scheduling request (SR) using a PUCCH format 3.

29. The user equipment of claim 23, wherein the IDC indicator is transmitted on the PUCCH using a cyclic shifted sequence included in an IDC cyclic shifted sequence category.

30. The user equipment of claim 21, wherein the physical layer uplink channel is a physical uplink shared channel (PUSCH).

31. The user equipment of claim 30, wherein the IDC indicator is multiplexed with an ACK/NACK signal on the PUSCH.

32. The user equipment of claim 31, wherein the IDC indicator and the ACK/NACK signal are transmitted using a modulation order of 2, 4, or 6.

33. The user equipment of claim 31, the one or more processors further configured to transmit a selected IDC solution on the PUSCH at a time that is substantially similar to a time the IDC indicator and the ACK/NACK signal are transmitted.

34. The user equipment of claim 30, wherein the IDC indicator is multiplexed with a rank indicator (RI) on the PUSCH.

35. The user equipment of claim 34, wherein the IDC indicator and the RI are transmitted using a modulation order of 2, 4, or 6.

36. The user equipment of claim 34, the one or more processors further configured to transmit a selected IDC solution on the PUSCH at a time that is substantially similar to a time the IDC indicator and the RI are transmitted.

37. The user equipment of claim 30, wherein the IDC indicator is multiplexed with at least one of a channel quality indicator (CQI) or a precoding matrix indicator (PMI) on the PUSCH.

38. The user equipment of claim 37, wherein the IDC indicator is encoded using a Reed-Muller code or a tail biting convolutional code.

39. The user equipment of claim 30, wherein the IDC indicator is transmitted on the PUSCH using a cyclic shifted sequence included in an IDC cyclic shifted sequence category.

40. The user equipment of claim 21, wherein the IDC indicator is a one-bit indicator indicating an existence of IDC interference to the base station.

41. A base station device comprising one or more processors configured to:
  receive an IDC indicator from a user equipment (UE) identifying the IDC interference on a physical layer uplink channel, wherein the IDC indicator is multiplexed with at least one of a channel quality indicator (CQI), a precoding matrix indicator (PMI), a hybrid automated repeat request (HARQ) acknowledgement/non-acknowledgement (ACK/NACK) signal, a scheduling request (SR), or a rank indicator (RI); and
  execute an IDC interference mitigation operation for the UE.

42. The base station device of claim 41, the one or more processors further configured to receive, from the UE, a selected IDC solution on the physical layer uplink channel.

43. The base station device of claim 41, wherein the physical layer uplink channel is a physical uplink control channel (PUCCH).

44. The base station device of claim 43, wherein the IDC indicator is decoded by using an orthogonal sequence on the PUCCH.

45. The base station device of claim 44, wherein the orthogonal sequence is generated based on a Hadamard-Walsh code.

46. The base station device of claim 43, the one or more processors further configured to receive a selected IDC solution using a Reed Muller code.

47. The base station device of claim 43, wherein the IDC indicator is received with at least one of a channel quality indicator (CQI) using a PUCCH format 2 or a precoding matrix indicator (PMI) using a PUCCH format 2.

48. The base station device of claim 43, wherein the IDC indicator is received with at least one of a hybrid automated repeat request (HARQ) acknowledgment/non-acknowledgment (ACK/NACK) signal using a PUCCH format 3 or a scheduling request (SR) using a PUCCH format 3.

49. The base station device of claim 43, wherein the IDC indicator is received on the PUCCH by using a cyclic shifted sequence included in an IDC cyclic shifted sequence category.

50. The base station device of claim 41, wherein the physical layer uplink channel is a physical uplink shared channel (PUSCH).

51. The base station device of claim 50, wherein the IDC indicator is received with an ACK/NACK signal on the PUSCH.

52. The base station device of claim 51, wherein the IDC indicator and the ACK/NACK signal are received using a modulation order of 2, 4, or 6.

53. The base station device of claim 51, the one or more processors further configured to receive a selected IDC solution on the PUSCH at a time that is substantially similar to a time the IDC indicator and the ACK/NACK signal are received.

54. The base station device of claim 50, wherein the IDC indicator is received with a rank indicator (RI) on the PUSCH.

55. The base station device of claim 54, wherein the IDC indicator and the RI are received using a modulation order of 2, 4, or 6.

56. The base station device of claim 54, the one or more processors further configured to receive a selected IDC solution on the PUSCH at a time that is substantially similar to a time the IDC indicator and the RI are received.

57. The base station device of claim 50, wherein the IDC indicator is received with at least one of a channel quality indicator (CQI) or a precoding matrix indicator (PMI) on the PUSCH.

58. The base station device of claim 57, wherein the IDC indicator is decoded by using a Reed-Muller code or a tail biting convolutional code.

59. The base station device of claim 50, wherein the IDC indicator is received on the PUSCH by using a cyclic shifted sequence included in an IDC cyclic shifted sequence category.

60. The base station device of claim 41, wherein the IDC indicator is a one-bit indicator indicating an existence of IDC interference.

* * * * *

UNITED STATES PATENT AND TRADEMARK OFFICE
CERTIFICATE OF CORRECTION

Page 1 of 1

PATENT NO.      : 9,100,969 B2
APPLICATION NO. : 13/424176
DATED           : August 4, 2015
INVENTOR(S)     : Kim et al.

It is certified that error appears in the above-identified patent and that said Letters Patent is hereby corrected as shown below:

In the Claims

Column 17, Line 4, In Claim 41, before "IDC interference" delete "the".

Signed and Sealed this
Third Day of May, 2016

Michelle K. Lee
*Director of the United States Patent and Trademark Office*